2 Sheets—Sheet 1.

W. H. ELLIOT

Revolver.

No. 1,936.

Reissued Apr. 18, 1865.

Witnesses.

R. T. Campbell

E. Schafer

Inventor.

W. H. Elliot by his Attys

Mason Fenwick & Lawrence

N. PETERS, PHOTO-LITHOGRAPHER, WASHINGTON, D. C.

W. H. ELLIOT.

Revolver.

No. 1,936.

Reissued Apr. 18, 1865.

Witnesses

R. T. Campbell
Elshofer

Inventor.

W. H. Elliot
by his Attys
Wilson, Fleming & Co

N. PETERS, PHOTO-LITHOGRAPHER, WASHINGTON, D. C.

UNITED STATES PATENT OFFICE.

WM. H. ELLIOT, OF PLATTSBURG, NEW YORK.

IMPROVEMENT IN REVOLVING FIRE-ARMS.

Specification forming part of Letters Patent No. 33,382, dated October 1, 1861; Reissue No. 1,936, dated April 18, 1865.

*To all whom it may concern:*

Be it known that I, W. H. ELLIOT, of Plattsburg, in the county of Clinton and State of New York, have invented certain new and useful Improvements in Breech-Loading Fire-Arms; and I do hereby declare that the following is a full, clear, and exact description thereof, reference being had to the accompanying drawings, making a part of this specification, which I designate as "Division No. 1."

Figure 1:
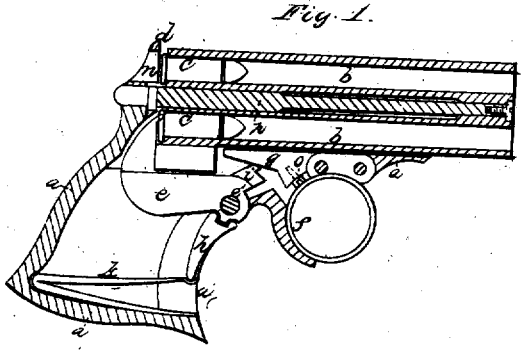
Figure 2:
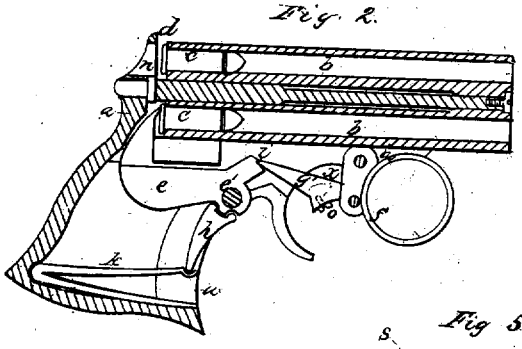
Figure 4:
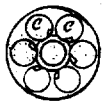
Figure 3:
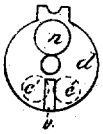
Figure 5:
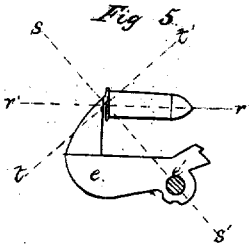
Figure 7:
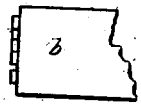
Figure 6:
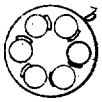
Figure 8:
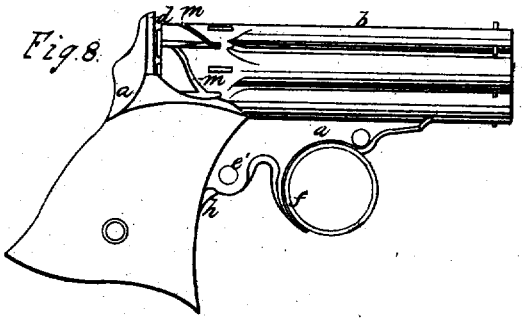
Figure 12:
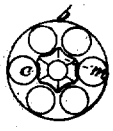
Figure 11:
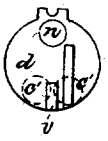
Figure 10:
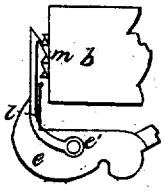
Figure 9:
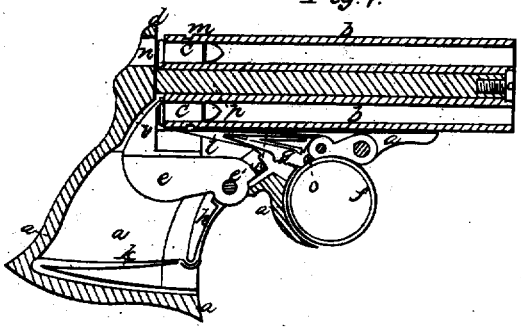
Figure 13:
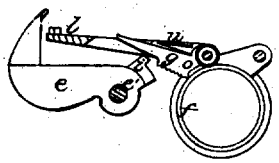
Figure 14:
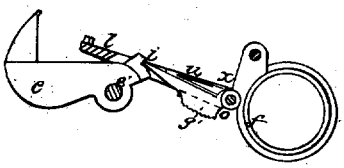
Figure 16:
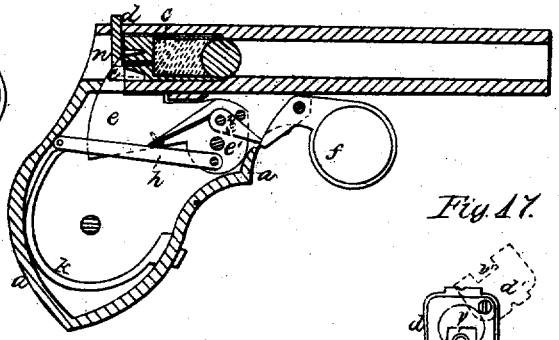
Figure 15:
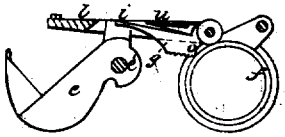
Figure 17:
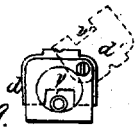
Figure 18:
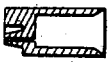
Figure 19:
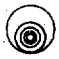

Figure 1 of the drawings is a vertical section of my improved arm, showing the lock in elevation and as it appears after being snapped. Fig. 2 is a similar section, but with the trigger pushed forward preparatory to firing. Fig. 3 is an elevation of a breech-plate. Fig. 4 is an elevation of the end of a series of barrels, showing the chambers filled with exploded cartridges. Fig. 5 is an elevation of a hammer and cartridge, the red lines showing the direction of certain forces at the moment of discharge. Fig. 6 is an elevation of the rear ends of a series of barrels, showing projections or anvils. Fig. 7 is a side elevation of the same. Fig. 8 is a side elevation of the arm with a revolving ratchet on the rear end of the barrel, as shown in my patent of May 29, 1860. Fig. 9 is a vertical longitudinal section of the same, showing a revolving-pawl attached to the trigger in an equivalent way to that shown in my patent of May 29, 1860. Figs. 10, 11, and 12 show the mode of revolving the barrels by a pawl and ratchet, as in my patent of August, 1858. The pawl here, however, is attached to the hammer, as is most common. Figs. 13, 14, and 15 show details of the arm represented by Figs. 8 and 9, the hammer, cocking-pawl, revolving-pawl, and trigger being shown in the three positions that they assume during the process of firing the arm. Fig. 16 is a vertical longitudinal section of a modification of my invention. Fig. 17 is a rear end elevation of the same. Figs. 18 and 19 are a section and end elevation of a cartridge used with this modification.

The same letters of reference in the different figures designate corresponding or similar parts.

The nature of this division of my invention consists in the combination of a chamber or chambers which are left open at their rear end for the purpose of being charged thereat with a hammer hung or pivoted forward of the rear ends of said chamber or chambers, as will be hereinafter described.

To enable others skilled in the art to make and use my invention and comprehend the same, I will proceed to describe it with reference to the drawings.

*a* is the lock-frame or frame of the breech, being that portion of the arm to which the lock is pivoted or otherwise properly attached. This frame may be in one piece or several pieces.

*b* is the barrel or barrels.

*c* represents the chambers with cartridges in them. These chambers are bored through at their rear end, and left open for the purpose of being charged in the rear.

*c'* shows position of the two lower cartridges in relation to the breech-plate. One of these at a time is fired by the hammer.

*d* is the breech-plate; *e*, hammer pivoted at *e'* underneath and forward of the rear end of the said chambers, and also forward of the breech-plate *d*; *g*, cocking-pawl; *g'*, position of cocking-pawl when prepared to fire; *o*, point on the cocking-pawl, which comes in contact with the side of the trigger and trips the hammer.

*h* is a stirrup. It is shown as furnished with two seats in the hammer; but it never was intended with this arm to have but one seat, although two were incidentally shown. The forward seat may be dispensed with, as it serves no purpose in this arm, as will be evident from Figs. 8 and 9.

*i* is a notch upon the hammer, into which the cocking-pawl falls.

*k* is a mainspring; *l*, Figs. 9, 10, 13, 14, and 15, revolving-pawl; *m*, ratchet or revolving grooves on the rear end of the barrels; *n*, opening through the breech-plate for loading the arm; *p*, base-pin, which supports the barrels and upon which the barrels revolve; *r r'*, directions of recoil; *s s'*, directions of the resistance of the same by the hammer; *t t'*, plane of the surface upon which the hammer acts; *u*, cocking and revolving pawl spring; *v*, a cut through the breech-plate to admit the firing-point of the hammer.

This arm, as represented in Fig. 1, is loaded by passing the cartridge through opening *n* in the breech-plate into the chamber *c;* and to fire the arm the trigger must first be pushed forward to the position represented in Fig. 2, when the rear end of the pawl *g* falls into the notch *i* upon the hammer, and as the trigger is carried back again the hammer is raised until the side of the trigger comes in contact with the cocking-pawl *g* at *o*, in which position it is ready to fire, and it is fired by drawing the trigger still farther back, which raises the rear end of the cocking-pawl out of the notch *i*, and the hammer falls upon the cartridge and explodes it. As the trigger is drawn back for the purpose of firing, the revolving-pawl, which is pivoted to it, is pushed back, and by this means the barrels are caused to revolve one-sixth of a revolution at each motion of the trigger, each time bringing a new cartridge under the firing-point. This is one of many ways in common use of revolving arms of this description, and constitutes no part of my claim at this date.

When it becomes necessary to pass the trigger back to its place without firing it it may be done by pressing upon the lower side of the cocking-pawl, when its rear end will be raised out of the notch *i* on the hammer, in which position the trigger may be carried back without raising the hammer.

To revolve the barrels for the purpose of loading, it is necessary that the point of the revolving-pawl should be held out of the ratchet, and also that the hammer should be raised a little, (otherwise its firing-point would drag over the heads of the cartridges,) and this may be done as follows: Push the trigger forward and place the end of a pencil through the opening X between the trigger-guard and trigger, above the pawls. Then draw back upon the trigger till the pencil is held fast. By this operation the revolving-pawl will be thrown out of the ratchet, and the hammer partly raised but firmly held, so that it can neither be brought to full-cock nor be snapped. While the parts are in this position the barrels may be safely revolved for the purpose of loading and cleaning.

That modification of my invention which is represented by Figs. 16 and 17 may be loaded by turning the breech-plate to the position represented by dotted lines *d'*, and by partially cocking the hammer this opens the chamber completely for the reception of the cartridge. After the cartridge has been placed in the chamber, the breech-plate returned to its place, and the hammer carefully let down, the arm is ready to fire, which is done by drawing the trigger directly back against the frame. The trigger may be placed back against the frame without firing by first depressing the fly $e^2$ of the hammer, so that the point of the trigger will not catch it. In drawing back the trigger to fire this arm the point of the trigger strikes the point of the fly $e^2$ and raises it, and at the same time depresses the free end of the hammer until the trigger passes the fly, when the hammer falls upon the priming. The lock in this modification operates the same as in my patent of August, 1858.

A striking peculiarity of this invention consists in the arrangement of the pivot of the hammer and that portion of the lock-frame to which the hammer is pivoted forward of the rear end of a chamber or chambers, which are bored through and left open for the purpose of being charged in the rear and also forward of the breech-plate, as represented. By "breech-plate" I mean that part of the arm marked *d*, against which the cartridge finally recoils when the discharge takes place, and which is generally detached from the said chamber. This breech-plate serves the purpose of breech-pin to the barrels, and can only be employed with a chamber or chambers that are bored through at their end, as above stated. The breech-plate may be attached to and supported upon the breech of the arm in many different ways. For instance, it may be secured permanently to the frame in the rear of the barrels and the chambers charged through it, as herein represented, and as represented in my patent of May 29, 1860, No. 28,461; or it may be secured with the lock-frame by a joint to the barrels and drop down out of the way of the chambers for the purpose of charging, as represented in my other patent of same date, No. 28,460; or the breech-plate may be jointed to the rear portion of the arm, so as to be turned away from before the chamber for the purpose of opening it to receive the charge, as represented in Fig. 16. In whatever way the breech-plate may be applied or supported in relation to the lock-frame or chamber it always serves one purpose—viz., that of finally resisting the backward force of the charge—a function which is the subject of other patents of mine bearing an earlier date than this, but not earlier invented.

I will here state that the description herein given with respect to the use of a breech-plate is not intended as a limitation of my invention to a fire-arm with a breech-plate, but simply to illustrate the superior utility of my invention when such a breech-plate is used. I however in manufacturing arms prefer to employ as an auxiliary to my invention a breech-plate of some sort, and hence I have described such ways as I consider the most perfect of employing a breech-plate, but not intending thereby to ever set up any claim under this patent to breech-plates, but to show that my invention is susceptible of being used with various styles of such plates without changing the result which it produces.

The arrangement of the pivot or joint of the hammer, as before specified, forward of the rear end of said chambers, has many advantages. When such arrangement is employed with a cylinder of revolving barrels or chambers, as herein shown, and with a breech-plate which is located permanently in their rear, the hammer fires most conveniently one of the lower barrels, leaving the whole of the upper part of the breech-plate to be cut away or otherwise disposed of, as may be most convenient for loading the arm, the whole of the hammer being at all times entirely out of the way during the process of loading, which would not be the case if it were pivoted in the rear of the chambers. A hammer which is pivoted as herein specified in relation to said chamber, without a breech-plate, or with a breech-plate which is jointed to the breech of the arm for the purpose of being turned away from before the chambers, as represented in Figs. 16 and 17, has the same advantage when cocked of being entirely below the line of the bore, and consequently out of the way during the process of loading; and in any case the employment of a hammer which is pivoted and arranged, as herein shown, in relation to a breech-plate, or to a chamber or chambers constructed as herein described, tends greatly to compact the arm and make it more durable, as well as to render its construction simple and less expensive, whether the arm be large or smaller, or whatever be its external form.

By reference to Figs. 1 and 2, Sheet 1, it may be seen that the hammer, although pivoted forward of the rear end of an open chamber, strikes up in the rear of said chamber, indenting the cartridge-shell a little, and holds onto it like a hook at the moment of the discharge. A hammer arranged and operating in this way on an arm from which the breech-plate has been removed for the experiment has been found to hold onto a cartridge-shell sufficiently strong to resist its recoil, and when employed, as herein shown, with a breech-plate, it performs the additional function of preventing pressure of the cartridge-shell upon the breech-plate after firing, and consequently there is less difficulty in moving the breech-plate away from before the chamber or the chamber from before the breech-plate for the purpose of removing the spent shells and reloading. To enable a hammer so pivoted to perform the function of resisting the recoil to such a degree as to prevent pressure upon a breech-plate after firing, as stated above, it is not essential that the point of the hammer should penetrate the shell to hold it from slippin. The power of the mainspring is sufficient for this purpose, as for this purpose it is only necessary that the hold of the cylindrical portion of the shell upon the inner surface of the chamber should be strong enough so that the pressure of the gases may bulge out the head of the cartridge a little to make it rest against the breech-plate at the moment the pressure of the gases takes place. After the pressure has ceased the head of the cartridge will to some degree return to its orignal form, and thus relieve the breech-plate of its pressure.

The recoil of the cartridge is rearward parallel with the bore of the barrel, or, as represented in Fig. 5, from $r\ r'$, the resistance of the hammer to the recoil of the cartridge being in the direction of $s$ to $s'$. The firing-point by the force of the blow is embedded into the copper shell, and thus produces a surface upon which it holds, the plane of which is in $t\ t'$, exactly at right angles to the line of resistance offered by the hammer. Thus it may be seen that the hammer without the assistance of the mainspring would not slip down upon the head of the cartridge. Numerous experiments have proven that either with or without a breech-plate the firing-point of the hammer, when properly constructed and arranged, is never displaced by the recoil of the cartridge.

Having described my invention, I claim under this patent—without confining myself to any method of attaching or supporting the breech-plate upon the arm in the rear of the chambers, or to any breech-plate at all, or to any particular form or size of arm—

The combination of a chamber or chambers which are left open at their rear end for the purpose of being charged thereat with a hammer hung or pivoted forward of the rear end of said chamber or chambers, substantially as set forth.

Witness my hand in the matter of my application for reissue of Letters Patent granted to me on October 1, 1861, for an improved breech-loading fire-arm, this 1st day of December, 1864.

W. H. ELLIOT.

Witnesses:
R. T. CAMPBELL,
E. SCHAFER.